Patented July 27, 1943

2,325,152

UNITED STATES PATENT OFFICE 2,325,152

METHOD OF PRESERVING RUBBER

Robert L. Sibley, Nitro, W. Va., assignor to Monsanto Chemical Company, St. Louis, Mo., a corporation of Delaware No Drawing. Application June 21, 1941, Serial No. 399,231. In Canada February 15, 1939

18 Claims. (Cl. 260—810)

The present invention relates to the art of rubber manufacture, and particularly relates to rubber compositions which resist deterioration due to aging or to exposure to the atmosphere. It has long been known that such deterioration can be greatly retarded by treating the rubber before or after vulcanization with certain substances known as age-resisters or antioxidants. One object of this invention is to provide a superior class of antioxidants for rubber.

The age-resisting characteristics of a vulcanized rubber product can be readily ascertained by subjecting samples of the vulcanized product in a bomb to the action of air or oxygen under elevated pressure. The aged rubber samples are then examined and tested and the test data compared with the results obtained on testing the unaged rubber samples. The deterioration in properties effected as a result of the oxidation treatment is indicative of the result that would normally be expected of that particular stock during actual service. Such a test is known as the Bierer-Davis aging test and produces an effect on a vulcanized rubber stock comparable with that resulting from several years of natural aging of the rubber depending upon the condition of the test.

It has been discovered in accordance with the present invention that the butyl and amyl resorcinols comprise a valuable group of antioxidants. In the preferred aspects of the invention there is employed a mono- or di-amyl or butyl resorcinol wherein the alkyl groups are branched chains. The new and preferred group of antioxidants couple good aging resistance with excellent resistance to discoloration.

The following specific embodiments of the invention show the desirable age resisting properties characteristic of the preferred class of materials and are to be understood as illustrating the invention and not limitative thereof.

A rubber base stock was compounded comprising

| | Parts by weight |
|---|---|
| Pale crepe rubber | 100 |
| Zinc oxide | 60 |
| Lithopone | 20 |
| Sulfur | 2 |
| Benzothiazyl thiol benzoate | 0.825 |
| Diphenyl guanidine phthalate | 0.675 |
| Paraffin | 0.25 |

To the base stocks so compounded 1.0 part by weight of antioxidant was added and the rubber stocks vulcanized in a press at the temperature of twenty pounds steam pressure per square inch. The cured rubber products were then artificially aged by heating for four hours in an air bomb at 250° F. and eighty pounds air pressure per square inch. The tensile strengths of the aged rubber products were then compared to those of the base stock, i. e. containing no antioxidant, the results being tabulated below. The figures are the ratios of the tensile strengths at break of the stocks containing an antioxidant to those containing no antioxidant. That is to say the base stock is arbitrarily taken as 100 and the tensiles of the protected stocks divided by the tensile of the base stock and multiplied by 100 to give a comparative rating.

Table I

| Antioxidant | Ratio of aged tensiles in— | |
|---|---|---|
| | 30 min. cure | 45 min. cure |
| None | 100 | 100 |
| Mono-tertiary butyl resorcinol | 127 | 121 |
| Di-tertiary butyl resorcinol | 140 | 134 |
| Mono-tertiary amyl resorcinol | 127 | 134 |

The above data show that the preferred class of materials impart appreciable resistance to aging to rubber compositions.

A cured sample of the white rubber base stock described above together with samples of the cured stock containing 1.0 part by weight of various substituted resorcinols were exposed to the rays of a sun lamp. After sixty hours exposure comparisons were made as to the discoloration which had taken place. The results are summarized below.

Table II

| | Antioxidant | Color of stock after exposure |
|---|---|---|
| 1 | None | Light yellow. |
| 2 | Di-tertiary butyl resorcinol | Light yellowish brown—almost matches blank. |
| 3 | Mono-tertiary butyl resorcinol | Light yellowish brown—slightly darker than either blank or #2. |
| 4 | Mono-tertiary amyl resorcinol | Light yellowish brown—matching #3. |
| 5 | Di-secondary amyl resorcinol | Matches blank. |
| 6 | Benzyl resorcinol | Pink. |
| 7 | Ethyl resorcinol | Decided yellowish brown. |

The above data show that the amyl and butyl substituted resorcinols are exceptionally resistant to discoloration.

From the specific examples hereinbefore set forth it is shown that rubber compositions containing small proportions of the preferred class of materials markedly resist the deteriorating influences of heat, oxidation and light.

Obviously practice of this invention is not limited to the specific compositions given above such compositions being merely illustrative of the manner of employing the antioxidants or age resisters of this invention. The antioxidants or age-resisters may be employed in different proportions than herein described and in conjunction with other vulcanizing agents than those specifically disclosed, for this invention is applicable generally to pure rubber or rubber compositions of the most varied nature. Furthermore, the preferred class of materials may be employed in rubber stocks in conjunction with other accelerators than those specifically shown with varying differences in tensile and modulus properties but still exhibiting the desirable properties of the class.

It is to be understood that the term "treating" as employed in the appended claims is used in a generic sense to include either the incorporating of the preferred class of materials into the rubber by milling or similar process, or their addition to the rubber latex before its coagulation, or the application thereof to the surface of a mass of crude or vulcanized rubber. The term "a rubber" is likewise employed in the claims in a generic sense to define a sulfur vulcanizable rubber material which possesses high extensibility under load coupled with the property of forcibly retracting to approximately its original size and shape when the load is removed. Such products include for example india rubber, reclaimed rubber, balata and gutta percha. The invention is also applicable to synthetic rubbers having the above properties.

The present invention is a continuation in part of copending application Serial No. 367,449 filed November 27, 1940, which is a continuation in part of application Serial No. 199,847 filed April 4, 1938.

The present invention is limited solely by the claims attached hereto as part of the present specification.

What is claimed is:

1. The method of preserving a rubber which comprises treating a rubber with an alkylated resorcinol wherein the alkyl group contains more than three but less than six carbon atoms.
2. The method of preserving a rubber which comprises treating a rubber with a resorcinol substituted in the nucleus by at least one but less than three alkyl groups containing more than three but less than six carbon atoms.
3. The method of preserving a rubber which comprises treating a rubber with a resorcinol substituted in the nucleus by at least one but less than three branched chain alkyl groups containing more than three but less than six carbon atoms.
4. The method of preserving a rubber which comprises treating a rubber with a resorcinol substituted in the nucleus by at least one but less than three tertiary alkyl groups containing more than three but less than six carbon atoms.
5. The method of preserving a rubber which comprises treating a rubber with a resorcinol substituted in the nucleus by at least one but less than three secondary alkyl groups containing more than three but less than six carbon atoms.
6. The method of preserving natural rubber which comprises treating natural rubber with a resorcinol possessing the structure

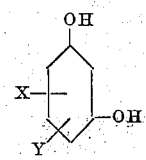

where X and Y represent branched chain alkyl radicals containing more than three but less than six carbon atoms.
7. The method of preserving natural rubber which comprises treating natural rubber with di-tertiary butyl resorcinol.
8. The method of preserving natural rubber which comprises treating natural rubber with di-secondary amyl resorcinol.
9. The method of preserving natural rubber which comprises treating natural rubber with mono-tertiary butyl resorcinol.
10. The vulcanized rubber product obtained by heating a rubber and sulfur in the presence of an alkylated resorcinol wherein the alkyl group contains more than three but less than six carbon atoms.
11. The vulcanized rubber product obtained by heating a rubber and sulfur in the presence of a resorcinol substituted in the nucleus by at least one but less than three alkyl groups containing more than three but less than six carbon atoms.
12. The vulcanized rubber product obtained by heating a rubber and sulfur in the presence of a resorcinol substituted in the nucleus by at least one but less than three branched chain alkyl groups containing more than three but less than six carbon atoms.
13. The vulcanized rubber product obtained by heating a rubber and sulfur in the presence of a resorcinol substituted in the nucleus by at least one but less than three tertiary alkyl groups containing more than three but less than six carbon atoms.
14. The vulcanized rubber product obtained by heating a rubber and sulfur in the presence of a resorcinol substituted in the nucleus by at least one but less than three secondary alkyl groups containing more than three but less than six carbon atoms.
15. The vulcanized rubber product obtained by heating natural rubber and sulfur in the presence of a resorcinol possessing the structure

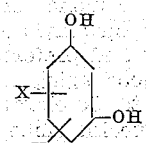

where X and Y represent branched chain alkyl radicals containing more than three but less than six carbon atoms.
16. The vulcanized rubber product obtained by heating natural rubber and sulfur in the presence of di-tertiary butyl resorcinol.
17. The vulcanized rubber product obtained by heating natural rubber and sulfur in the presence of di-secondary amyl resorcinol.
18. The vulcanized rubber product obtained by heating natural rubber and sulfur in the presence of mono-tertiary butyl resorcinol.

ROBERT L. SIBLEY.